United States Patent [19]

Birkemeier et al.

[11] 4,170,011
[45] Oct. 2, 1979

[54] PRECISION ANTENNA ALIGNMENT PROCEDURE

[75] Inventors: William P. Birkemeier, Madison, Wis.; Anthony E. Sill, Albuquerque, N. Mex.

[73] Assignee: The United States of America as represented by the Secretary of the Air Force, Washington, D.C.

[21] Appl. No.: 865,269

[22] Filed: Dec. 28, 1977

[51] Int. Cl.$^2$ ............................................. H04B 7/02
[52] U.S. Cl. .............................. 343/100 CS; 325/56
[58] Field of Search .................. 343/100 CS, 100 R; 325/56

[56] References Cited

U.S. PATENT DOCUMENTS

| 2,239,775 | 4/1941 | Bruce | 343/100 CS |
| 3,821,646 | 2/1972 | Bickford et al. | 343/100 CS X |

OTHER PUBLICATIONS

Proceedings of the IEEE, vol. 57, No. 4, pp. 552–559.

Primary Examiner—Maynard R. Wilbur
Assistant Examiner—Richard E. Berger
Attorney, Agent, or Firm—Joseph E. Rusz; Willard R. Matthews

[57] ABSTRACT

Precise azimuthal alignment of troposcatter system antennas is achieved by centering on the great circle, the combined pattern of intercepting beams from two troposcatter antennas. The combined antenna pattern is determined to be centered on and symmetric about the great circle when the Doppler spectrum on a received signal is symmetric about zero Doppler shift. The alignment procedure comprehends antenna manipulation, initially with both beams focussed and subsequently with one beam defocussed, until the desired Doppler spectrum condition is obtained. The requisite Doppler information is derived and processed by novel cross correlation techniques and data processing procedures.

6 Claims, 1 Drawing Figure

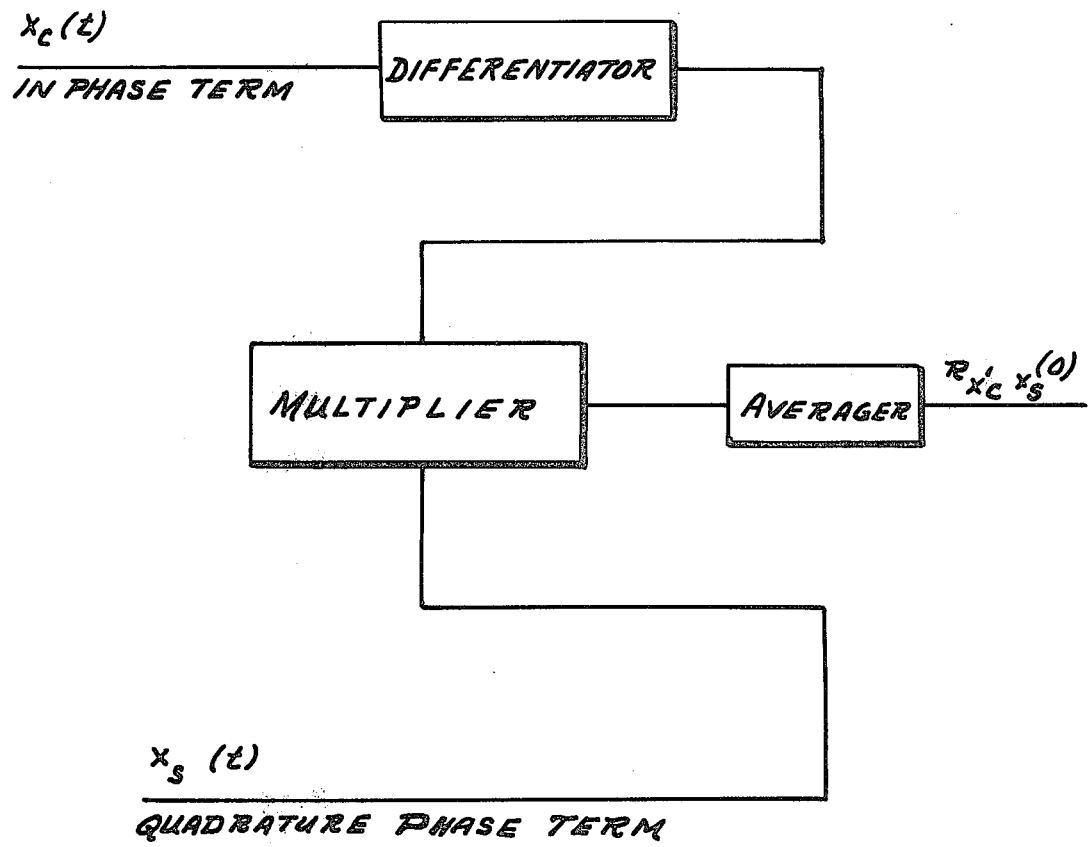
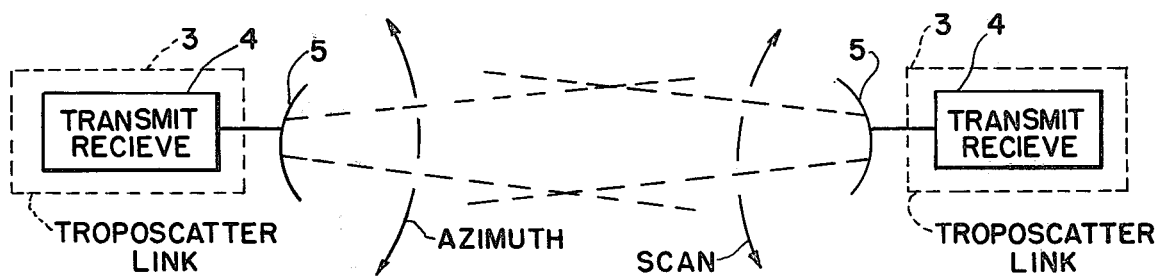

PRECISION ANTENNA ALIGNMENT PROCEDURE

STATEMENT OF GOVERNMENT INTEREST

The invention described herein may be manufactured and used by or for the Government for governmental purposes without the payment of any royalty thereon.

BACKGROUND OF THE INVENTION

This invention relates to troposcatter communications systems and in particular to a precision antenna alignment procedure for such systems.

Up to the present time troposcatter antennas have been aligned by attempting to maximize the received signal power. Because of deep, persistent fading on scatter channels the proper pointing angle alignment for each antenna is difficult to determine by this method and both antennas are often fixed in less than the optimum pointing position. Accordingly, there currently exists the need for troposcatter antenna alignment techniques that do not depend on received signal power. It is also desirable that such techniques be practiced without the use of complex computer programs or expensive special purpose computers. The present invention is directed toward satisfying the need for improved troposcatter alignment techniques by alignment methods utilizing Doppler shift characteristics instead of signal power maximization and cross correlation techniques and data processing procedures instead of computer processing.

SUMMARY OF THE INVENTION

The precision antenna alignment method of the invention comprehends aligning the beams from two antennas with the great circle. This is accomplished by: rotating one of the antennas in azimuth until the combined beam pattern of the two antennas is centered on and symmetrical about the great circle; defocussing the beam of the rotated antenna; rotating both antennas simultaneously and oppositely in azimuth by small increments until the combined beam pattern is again centered on and symmetrical about the great circle; and, focussing the defocussed beam. Centering of the combined beam patterns on the great circle is determined to be coincident with the condition in which the Doppler spectrum on a received signal is symmetrical about zero Doppler shift. Cross correlation techniques and data processing procedures are employed to detect the antenna orientations for which the desired Doppler conditions exist.

It is a principal object of the invention to provide a new and improved method for the precision alignment of troposcatter communications system antennas.

It is another object of the invention to provide a method of aligning troposcatter communications system antennas that does not depend upon received signal power.

These together with other objects features and advantages of the invention will become more readily apparent for the following detailed description when taken in conjuntion with the illustrative embodiment in the accompanying drawing.

DESCRIPTION OF THE DRAWINGS

FIG. 1 is an illustration in block diagram form of a prior art troposcatter system; and, FIG. 2 is a block diagram of the differentiator/multiplier circuit used in the data processing procedure of the invention.

DETAILED DESCRIPTION OF THE PREFERRED EMBODIMENT

The invention comprehends a technique to effect the precise azimuthal alignment of microwave communications antennas on transhorizon troposcatter links. It is also concerned with a technique to test for proper alignment on an operating link in a troposcatter communications system.

FIG. 1 is an illustration of such a troposcatter communications system. It includes troposcatter links 3, transmit/receive units 4, scannable antennas 5 and other conventional signal processing functions.

In principle the invention does not make direct use of the signal power and thereby avoids the problem of signal fading. Instead it makes use of the Doppler shifts on the received signal which arise from the wind drift of the scattering elements in the antennas' common-volume. It also makes use of the fact that scatters move essentially horizontally with the wind creating zero Doppler shift at the great circle plane and Doppler shift proportional to cross-path displacement and cross-path wind speed elsewhere in the common volume.

It has been shown in the periodical article by W. P. Birkemeier, P. F. Duvoisin, A. B. Fontaine and D. W. Thomsen entitled *Indirect atmospheric measurements utilizing Rake tropospheric scatter techniques —Part II: Radiometeorological interpretation of Rake channel sounding observations*, Proc. IEEE, 57 (4), 552–559 that if the combined antenna pattern is symmetrical in azimuthal angle and centered on the great-circle that the received Doppler spectrum will, on the average, be symmetrical in frequency about zero Doppler shift.

The first step in the alignment procedure is therefore to move one antenna (keeping the other fixed) until a Doppler spectrum symmetric about zero shift is obtained. This indicates that the combined antenna pattern is centered on the great circle. The two antennas' beams then straddle the great circle, but their displacement sense and amount are as yet unknown.

The second step in the procedure requires one antenna to be defocussed slightly or otherwise modified so as to symmetrically spread the beam about the boresite. When this is accomplished the combined pattern shifts away from the great circle toward the position of the unaltered pattern. The Doppler spectrum shifts similarly so that it is also no longer symmetric about zero Doppler shift. The antennas may now be moved synchronously and oppositely, either clockwise or counter-clockwise, in incremental steps which are small compared to a beam width. If the proper directions are chosen the two patterns will converge on the great circle restoring the composite pattern to great circle symmetry. When the corresponding Doppler spectrum becomes symmetrical about zero Doppler shift the proper great circle beam position has been reached. If the opposite set of directions are chosen the patterns diverge from the great circle producing a less symmetrical Doppler spectrum and eventual obvious loss of power. When the great circle position is reached by the antennas the defocused antenna is refocussed to complete the alignment procedure.

A further feature of the invention is a technique used to determine the symmetry of the Doppler spectrum. Rather than computer processing of the received signal use is made of the fact that the in-phase and quadrature-phase components of the complex envelope of the narrow-band scattered signal are uncorrelated processes when the spectrum of the narrowband signal is symmetrical about the signal's carrier frequency. Moreover, when the spectrum is unsymmetrical these same components become uncorrelated random variables with a crosscorrelation function which is odd.

To clarify this idea the received narrowband signal may be expressed as $$x(t) = x_c(t) \cos \omega_c t - x_s(t) \sin \omega_c t. \quad (1)$$

Taking the crosscorrelation of the two quadrature components $x_c(t)$ and $x_s(t)$ it can be shown that $$R_{x_c x_s}(\tau) = R_{xx}(\tau) \sin \omega_c \tau - \hat{R}_{xx}(\tau) \cos \omega_c \tau \quad (2)$$

where $\hat{R}_{xx}(\tau)$ is the Hilbert transform of $R_{xx}(\tau)$. Taking the Fourier transform it can be readily shown that $$S_{x_c x_s}(\omega) = j[S_D(\omega) - S_D(-\omega)] \quad (3)$$

where $S_D(\omega)$ is the Doppler spectrum of x(t). Thus $S_{x_c x_s}(\omega)$ and $R_{x_c x_s}(\tau)$ are identically equal to zero when $S_D(\omega)$ is symmetric about zero Doppler shift.

Hence to align the antennas using a correlator one antenna is swung slowly until the crosscorrelation function of the quadrature components is zero for all values of delay $\tau$ at which point the antenna beams symmetrically straddle the great circle. Next one of the antennas is defocussed. If the crosscorrelation function is still identically equal to zero the antennas are properly aligned. If not the antennas should both be synchronously moved either clockwise or counterclockwise in incremental steps that are small compared with the antenna beam width. If the proper direction of rotation is chosen the maximum amplitude of the crosscorrelation function will become smaller and the entire function will finally go to zero at which point the antennas are properly aligned. If the antenna beams are moved away from each other the crosscorrelation function will not go to zero for all values of delay but the function will ultimately decrease in amplitude as the received signal power falls off.

Still another aspect of the invention is a data processing procedure that eliminates the need for a special purpose computer or correlator. This is possible because it is not necessary to calculate the entire crosscorrelation function. Since $R_{x_c x_s}(\tau)$ is a smooth, odd function of $\tau$ and has finite slope at the origin, $dR_{x_c x_s}(\tau)/d\tau$ exists and equals zero when $R_{x_c x_s}(\tau)$ equals zero. Also, since the crosscorrelation function is identically equal to zero for all values of delay only if the Doppler spectrum is symmetric about zero Doppler shift it is possible to test for proper antenna alignment by measuring the derivative of the crosscorrelation function at zero lag. Using the well-known fact that $$(d/d\tau) R_{x_c x_s}(\tau) = R_{x_c' x_s}(\tau) \quad (4)$$

where $x_c'$ denotes $dx_c(t)/dt$, $R_{x_c' x_s}(0)$ can be obtained merely by using a multiplier and differentiator as shown in FIG. 1. The output of this device will be zero when the antennas straddle the great cricle or are aligned and nonzero in other cases. Hence to align the antennas either antenna is moved until the device output has minimum amplitude. One antenna is then defocussed and the antennas are synchronously moved until the output amplitude is again minimized at which point the antennas are properly aligned.

There have been described procedures for aligning scatter antennas using the crosscorrelation of the quadrature components of the received signal and antenna beam defocussing. Other variations of these procedures such as minimizing the magnitude of the crosscorrelation function by alternately moving one antenna with the other antenna fixed and/or defocussed or other procedures which rely on the principles disclosed here are also comprehended by the invention. Therefore, while the invention has been described in terms of its preferred embodiment it is understood that the words which have been used are words of description rather than words of limitation and that changes within the purview of the appended claims may be made without departing from the scope and spirit of the invention in its broader aspects.

What is claimed is:

1. The method of obtaining precise azimuthal alignment of two troposcatter antennas in a troposcatter communication system comprising the steps of
   effecting by means of antenna scanning the condition in which the Doppler spectrum on a received signal is symmetric about zero doppler shift,
   defocussing the beam of one of said antennas,
   again effecting by means of antenna scanning the condition in which the Doppler spectrum on the received signal is symmetric about zero Doppler shift, and
   focussing said defocussed beam.

2. The method of obtaining precise azimuthal alignment of two troposcatter antennas in a troposcatter communication system comprising the steps of
   scanning said antennas until focussed beams therefrom intercept and the combined beam pattern is symmetrical about the great circle,
   defocussing one of said beams,
   again scanning said antennas until the combined beam pattern is symmetrical about the great circle, and
   focussing said defocussed beam.

3. The method of obtaining precise azimuthal alignment of two troposcatter antennas as defined in claim 2 wherein the antenna scanning of the first and third steps effect the condition in which the Doppler spectrum on a received signal is symmetric about zero Doppler shift.

4. The method of obtaining precise azimuthal alignment if two troposcatter antennas as defined in claim 3 wherein the antenna scanning of the first step comprises rotating one antenna in azimuth until the Doppler spectrum on the received signal is symmetric about zero Doppler shift, and
   the antenna scanning of the third step comprises rotating both antennas simultaneously in opposite azimuth directions in increments that are small compared to the beam widths until the Doppler spectrum on the received signal is symmetric about zero Doppler shift.

5. The method of obtaining precise azimuthal alignment of two troposcatter antennas as defined in claim 2 including the step of processing a received signal with a correlator to obtain cross correlation functions of the quadrature components of said received signal and performing the antenna scannings of steps one and three until the cross-correlation function of the quadrature components is zero for all values of delay $\tau$.

6. The method of obtaining precise azimuthal alignment of two troposcatter antennas as defined in claim 2 including the steps of differentiating the in-phase components of a received signal and performing the antenna scannings of steps one and three until the product of the quadrature phase components and the differentiated in-phase components of the received signal is a minimized value.

* * * * *